Dec. 7, 1937.  A. C. WALDVOGEL  2,101,418
CAFFEINE COLLECTOR
Filed Nov. 8, 1934  2 Sheets-Sheet 1
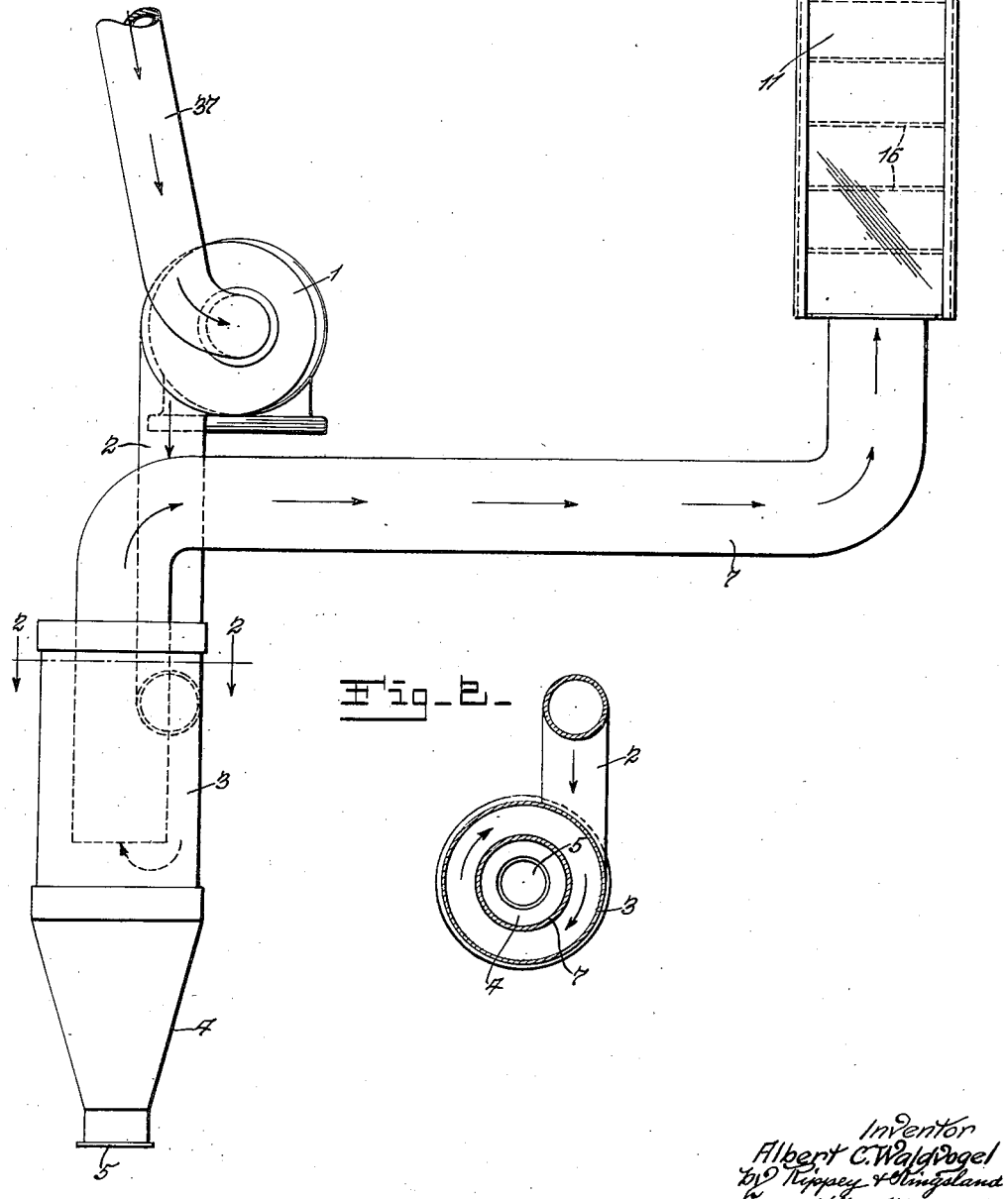
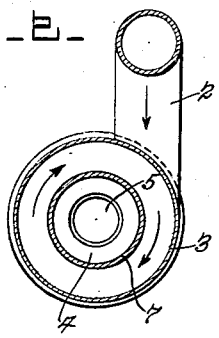
Inventor
Albert C. Waldvogel
by Rippey & Kingsland
His Attorneys Dec. 7, 1937.  A. C. WALDVOGEL  2,101,418
CAFFEINE COLLECTOR
Filed Nov. 8, 1934  2 Sheets-Sheet 2
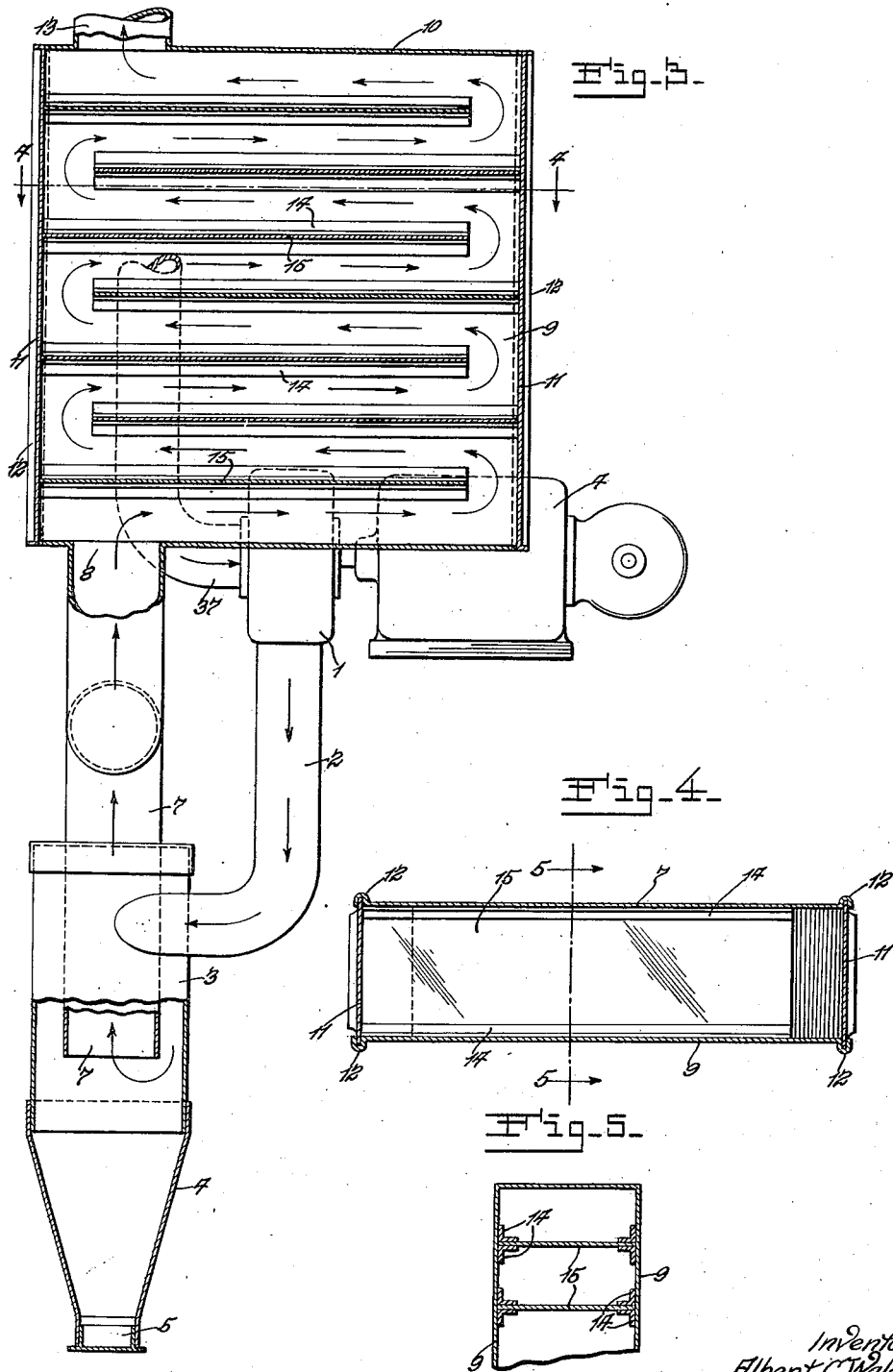
Inventor
Albert C. Waldvogel
His Attorneys Patented Dec. 7, 1937

2,101,418

UNITED STATES PATENT OFFICE 2,101,418

CAFFEINE COLLECTOR

Albert C. Waldvogel, Richmond Heights, Mo.

Application November 8, 1934, Serial No. 752,041

5 Claims. (Cl. 183—94)

This invention relates to caffeine collectors, and has special reference to a device for use in connection with a coffee roasting apparatus to collect the caffeine and to prevent the caffeine from passing into or through the flue into or through which the fumes and vapors produced by the roasting of the coffee ordinarily pass.

An object of the invention is to provide a device for collecting caffeine in a coffee roasting apparatus and particularly in a coffee roasting apparatus of comparatively small size or capacity, and to prevent the caffeine from passing into or through the flues through which the fumes and vapors carrying the caffeine would otherwise pass.

By use of this invention in a coffee roasting apparatus, the caffeine is detached and separated from the fumes and vapors that are discharged from the roasting apparatus and is thereby prevented from becoming lodged in the flue through which the fumes pass and is saved for commercial purposes.

Other advantages of the invention will be readily apparent from the following description, reference being made to the annexed drawings, in which—

Fig. 1 is a side elevation of the invention.

Fig. 2 is a cross sectional view on the line 2—2 of Fig. 1.

Fig. 3 is a view showing a section of the collector compartment and the trays mounted therein which form a tortuous passage and which trays receive and retain the caffeine.

Fig. 4 is a cross sectional view on the line 4—4 of Fig. 3.

Fig. 5 is a cross sectional view on the line 5—5 of Fig. 4.

A coffee roasting apparatus is the subject of my copending application Serial No. 752,040, filed Nov. 8, 1934, which discloses a pipe leading from the roasting compartment and which is the pipe 37 herein shown (Fig. 1). The pipe 37 opens into a blower 1 which operates to force the fumes and vapors and the caffeine carried thereby through a pipe 2 opening into the upper portion of a compartment 3. The blower may be of any appropriate construction operated by a motor 4.

The lower portion 4 of the compartment 3 is downwardly tapered and its lower end, which is of reduced diameter, receives and frictionally supports the circular wall of a removable and replaceable cup 5. The cup 5 provides a removable and replaceable closure for the lower end of the compartment comprising the parts 3 and 4.

A pipe 7 extends downwardly into the upper portion of the compartment 3 a substantial distance below the opening from the pipe 2, so that the fumes and vapors bearing the caffeine are required to pass downwardly within the compartment 3 through the space around the pipe 7 by a whirling movement obtained by the relationship of the parts described including the downwardly tapered portion 4 of the compartment 3.

The pipe 7 opens through the bottom wall 8 of a compartment that includes side walls 9 attached to the side edges of the wall 8, a top wall 10 attached to the upper edges of the side walls 9, and removable and replaceable end walls 11 mounted in grooves 12 formed in connection with the ends of the walls 9. The walls 11 are removable and replaceable in order to open and close the compartment, as desired.

A pipe 13 opens through the upper wall 10 and functions as a passage or flue through which the waste vapors are discharged.

Series of horizontal brackets 14 are attached to the inner surfaces of the side walls 9 and constitute supports and guides for trays 15. As shown (Fig. 3), the trays are in series, one series of the trays extending from one of the end walls 11 and terminating short of the opposite end wall 11; and the other series of trays extending from that end wall 11, which is beyond the ends of the first series of trays, toward the first end wall 11 and terminating short thereof and alternating with the first series of trays. Thus, a tortuous passage is formed within the collector compartment by a staggered or disalined relationship of the two series of trays.

In operation, the fumes and vapors carrying the caffeine are driven through the pipe 2 into the compartment 3 above the opening to the pipe 7 with such velocity as to impart to the fumes and vapors and the caffeine carried thereby a cyclonic whirl. Chaff included in the fumes is separated out by this centrifugal movement. The fumes and vapors and the caffeine carried thereby then pass upwardly through the pipe 7 into the lower end of the collector compartment. The arrangement of the trays 15 in the collector compartment provides a tortuous passage and said trays constitute baffles that function to separate most of the caffeine from the fumes and vapors and to receive and retain the caffeine, leaving the waste fumes free to pass out through the flue pipe 13.

The end walls 11 may be removed to afford access to the inside of the collector compartment to permit removal and replacement of the trays and removal of the collected caffeine.

The construction and arrangement of the device may be varied within the scope of equivalent limits without departure from the nature and principle of the invention.

I claim:

1. In a device of the character described, a compartment comprising side, bottom and top walls, end walls, means for holding said end walls detachably connected with said side walls, vertical series of horizontal brackets attached to said side walls, and vertical series of trays supported by said brackets for longitudinal sliding movements for removal and replacement and forming a tortuous passage from the lower end to the upper end of said compartment.

2. In a device of the character described, a compartment comprising side, bottom and top walls, end walls, means for holding said end walls detachably connected with said side walls, vertical series of horizontal brackets attached to said side walls, vertical series of trays supported by said brackets for longitudinal sliding movements for removal and replacement and forming a tortuous passage from the lower end to the upper end of said compartment, and pipes opening into said compartment at the opposite ends of said passage.

3. In a device of the character described, a compartment comprising side, bottom and top walls, end walls, means for holding said end walls detachably connected with said side walls, vertical series of horizontal brackets attached to said side walls, vertical series of trays supported by said brackets for longitudinal sliding movements for removal and replacement and forming a tortuous passage from the lower end to the upper end of said compartment, pipes opening into said compartment at the opposite ends of said passage adjacent to one of said end walls, and mechanism for forcing the vapors and caffeine of roasted coffee along one of said pipes and through said passage.

4. In a device of the character described, a compartment comprising side, bottom and top walls, end walls, means in connection with said side walls for holding said end walls in cooperative relationship with said side, bottom and top walls to form said compartment, vertical series of horizontal brackets attached to said side walls, vertical series of trays supported by said brackets for longitudinal sliding movements for removal and replacement and cooperating with said side walls and said end walls to form a tortuous passage from the lower end to the upper end of said compartment, and pipes opening into said compartment at the opposite ends of said passage.

5. In a device of the character described, a compartment comprising side, bottom and top walls, end walls, means in connection with said side walls for holding said end walls in cooperative relationship with said side, bottom and top walls to form said compartment, vertical series of horizontal brackets attached to said side walls, vertical series of trays supported by said brackets for longitudinal sliding movements for removal and replacement and cooperating with said side walls and with said end walls to form a tortuous passage from the lower end to the upper end of said compartment, pipes opening into said compartment at the opposite ends of said passage, and mechanism for forcing the vapors and caffeine of roasted coffee through one of said pipes into said passage and thence through the other pipe.

ALBERT C. WALDVOGEL.